US012794791B2

(12) United States Patent
Tishbi et al.

(10) Patent No.: US 12,794,791 B2
(45) Date of Patent: Nov. 10, 2026

(54) TECHNIQUES FOR FATIGUE REDUCTION AND LOAD MANAGEMENT OF BACKPRESSURE IN CYBERSECURITY RESPONSE

(71) Applicant: Avalor Technologies, Ltd., Ramat Gan (IL)

(72) Inventors: Kfir Aharon Tishbi, Herzliya (IL); Raanan Raz, Tel Aviv (IL)

(73) Assignees: Avalor Technologies, Ltd., Ramat Gan (IL); Zscaler, Inc., Santa Clara, CA (US)

( * ) Notice: Subject to any disclaimer, the term of this patent is extended or adjusted under 35 U.S.C. 154(b) by 3 days.

(21) Appl. No.: 18/409,353

(22) Filed: Jan. 10, 2024

(65) Prior Publication Data

US 2025/0227043 A1 Jul. 10, 2025

(51) Int. Cl.
*H04L 41/5074* (2022.01)
*H04L 41/22* (2022.01)

(52) U.S. Cl.
CPC .......... *H04L 41/5074* (2013.01); *H04L 41/22* (2013.01)

(58) Field of Classification Search
None
See application file for complete search history.

(56) References Cited

U.S. PATENT DOCUMENTS 7,779,119 B2 8/2010 Ginter et al.
9,628,501 B2 4/2017 Datta et al.
10,346,851 B1 * 7/2019 Kapoor ............... G06F 16/3344
10,395,271 B2 8/2019 Kassko et al.
10,505,825 B1 * 12/2019 Bettaiah .................. G06F 16/22
10,535,002 B2 * 1/2020 Gupta ....................... G06N 5/01
10,754,877 B2 8/2020 Kassko et al.
11,188,405 B1 * 11/2021 Garty .................. G06F 11/0751
11,200,538 B2 * 12/2021 Srinivasan ............. G06Q 10/10
11,503,064 B1 11/2022 Aloisio et al.
11,783,515 B2 10/2023 Sheffer et al.
2002/0087383 A1 * 7/2002 Cogger ............... G06F 11/0709 707/E17.107
2009/0186610 A1 * 7/2009 Avni ..................... H04W 24/08 455/425
2010/0057657 A1 * 3/2010 Boothe .................... G06N 5/04 706/46

(Continued)

FOREIGN PATENT DOCUMENTS

WO WO 2025013059 A1 * 7/2024

*Primary Examiner* — Sandarva Khanal
(74) *Attorney, Agent, or Firm* — Baratta Law PLLC; Lawrence A. Baratta, Jr.

(57) ABSTRACT

A system and method for load management and back pressure reduction in managing support ticket resolution is presented. The method includes continuously determining support ticket resolution capacity based on a number of previously resolved support tickets; continuously receiving a plurality of support tickets; periodically determining a severity score associated with each support ticket of the plurality of support tickets; and assigning a support ticket of the plurality of support tickets to a user account based on the determined severity score and the determined resolution capacity, such that a number of assigned support tickets to the user account does not exceed the determined resolution capacity.

19 Claims, 4 Drawing Sheets

(56) References Cited

U.S. PATENT DOCUMENTS

| | | | | |
|---|---|---|---|---|
| 2012/0323640 | A1* | 12/2012 | Sabharwal | G06Q 10/06398 705/7.39 |
| 2014/0270135 | A1* | 9/2014 | Odinak | H04M 3/523 379/265.03 |
| 2014/0278646 | A1* | 9/2014 | Adrian | G06Q 10/063114 705/7.15 |
| 2015/0112771 | A1* | 4/2015 | Read | G06F 16/285 705/7.38 |
| 2017/0076296 | A1* | 3/2017 | Hirpara | G06Q 50/04 |
| 2018/0131810 | A1* | 5/2018 | Yokel | H04M 3/5233 |
| 2018/0253736 | A1* | 9/2018 | Rajaram | G06Q 30/016 |
| 2018/0295154 | A1 | 10/2018 | Crabtree et al. | |
| 2018/0336485 | A1* | 11/2018 | Bikumala | G06F 16/285 |
| 2019/0158366 | A1* | 5/2019 | Higgins | G06Q 30/016 |
| 2020/0259728 | A1 | 8/2020 | Oren et al. | |
| 2020/0293946 | A1* | 9/2020 | Sachan | G06N 5/04 |
| 2020/0364949 | A1* | 11/2020 | Bachant | G06F 16/285 |
| 2022/0019556 | A1* | 1/2022 | Biswas | G06F 16/16 |
| 2022/0038351 | A1* | 2/2022 | Jasionowski | H04L 41/5019 |
| 2022/0353282 | A1 | 11/2022 | Paine | |
| 2023/0171146 | A1* | 6/2023 | Gardini Vedovatto | H04L 41/5067 455/423 |
| 2024/0056368 | A1* | 2/2024 | Banaji | H04L 41/5074 |
| 2024/0119384 | A1* | 4/2024 | Kumar | G06Q 10/06398 |
| 2024/0320574 | A1* | 9/2024 | Johnson | G06Q 10/1093 |
| 2024/0363246 | A1* | 10/2024 | Ganesan | G16H 10/60 |
| 2024/0412048 | A1* | 12/2024 | Knudson | G06F 40/40 |
| 2024/0430178 | A1* | 12/2024 | Ambhaikar | H04L 41/5009 |
| 2025/0173607 | A1* | 5/2025 | Talwalkar | G06N 20/00 |

* cited by examiner

TECHNIQUES FOR FATIGUE REDUCTION AND LOAD MANAGEMENT OF BACKPRESSURE IN CYBERSECURITY RESPONSE

TECHNICAL FIELD

The present disclosure relates generally to a support ticket system, and more specifically, to methods of increasing efficiency in management and distribution of support tickets.

BACKGROUND

Computing environments have increasingly grown complex, and this is especially true for cloud computing environments. In addition, these environments often have resources, principals, and the like, which are spun up, spun down, etc., based on demand for such resources. These environments are managed by various workloads, such as orchestrators, serverless functions, and the like, which generate status reports, alerts, etc.

Cybersecurity monitoring solutions which are configured to detect cybersecurity issues, such as misconfigurations, vulnerabilities, exposures, etc., are one of many possible environments which interact with a computing environment. A cybersecurity monitoring solution can also generate alerts, for example based on detection of cybersecurity issues.

This abundance of resources, principals, and the like, in a computing environment, lead to creating an abundance of alerts, which in turn are often the cause of generating a support ticket in a ticketing system, meant to monitor an issue until it is resolved, for example by a human operator.

However, this abundance of tickets leads to alert fatigue, which in turn can cause a human operator to miss an important alert hidden among a group of other alerts.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include continuously determining support ticket resolution capacity based on a number of previously resolved support tickets. Method may also include continuously receiving a plurality of support tickets. Method may furthermore include periodically determining a severity score associated with each support ticket of the plurality of support tickets. Method may in addition include assigning a support ticket of the plurality of support tickets to a user account based on the determined severity score and the determined resolution capacity, such that a number of assigned support tickets to the user account does not exceed the determined resolution capacity. Other embodiments of this aspect include corresponding computer systems, apparatus, and computer programs recorded on one or more computer storage devices, each configured to perform the actions of the methods.

Implementations may include one or more of the following features. Method may include: generating a visualization of the resolution capacity. Method may include: determining support ticket resolution capacity based on mean time to resolve. Method may include: determining a support ticket resolution capacity based on a plurality of ticket types. Method may include: determining that an assigned ticket is resolved; and assigning an additional ticket to a user account associated with the resolved ticket. Method may include: assigning a first number of support tickets to the user account based on the resolution capacity and a first type of ticket; and assigning a second number of support tickets to the user account based on the resolution capacity and a second type of ticket. Method where assigning the support ticket further includes: determining a user group associated with the user account; and assigning the support ticket further based on the determined user group. Implementations of the described techniques may include hardware, a method or process, or a computer tangible medium.

In one general aspect, non-transitory computer-readable medium may include one or more instructions that, when executed by one or more processors of a device, cause the device to: continuously determine support ticket resolution capacity based on a number of previously resolved support tickets. Medium may furthermore include continuously receive a plurality of support tickets. Medium may in addition include periodically determine a severity score associated with each support ticket of the plurality of support tickets. Medium may moreover include assign a support ticket of the plurality of support tickets to a user account based on the determined severity score and the determined resolution capacity, such that a number of assigned support tickets to the user account does not exceed the determined resolution capacity. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: continuously determine support ticket resolution capacity based on a number of previously resolved support tickets. System may in addition continuously receive a plurality of support tickets. System may moreover periodically determine a severity score associated with each support ticket of the plurality of support tickets. System may also assign a support ticket of the plurality of support tickets to a user account based on the determined severity score and the determined resolution capacity, such that a number of assigned support tickets to the user account does not exceed the determined resolution capacity. Other embodiments of this aspect corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine support ticket resolution capacity based on mean time to resolve. System where the memory contains further instructions which when executed by the processing circuitry further configure the system to: determine a support ticket resolution capacity based on a plurality of ticket type. System where the memory contains further instructions which when executed by the processing circuitry further configure the system to: determine that an assigned ticket is resolved; and assign an additional ticket to a user account associated with the resolved ticket. System where the memory contains further instructions which when executed by the processing circuitry further configure the system to: assign a first number of support tickets to the user account based on the resolution capacity and a first type of ticket; and assign a second number of support tickets to the user account based on the resolution capacity and a second type of ticket. System where assigning the support ticket further includes: determining a user group associated with the user account; and assigning the support ticket further based on the determined user group. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
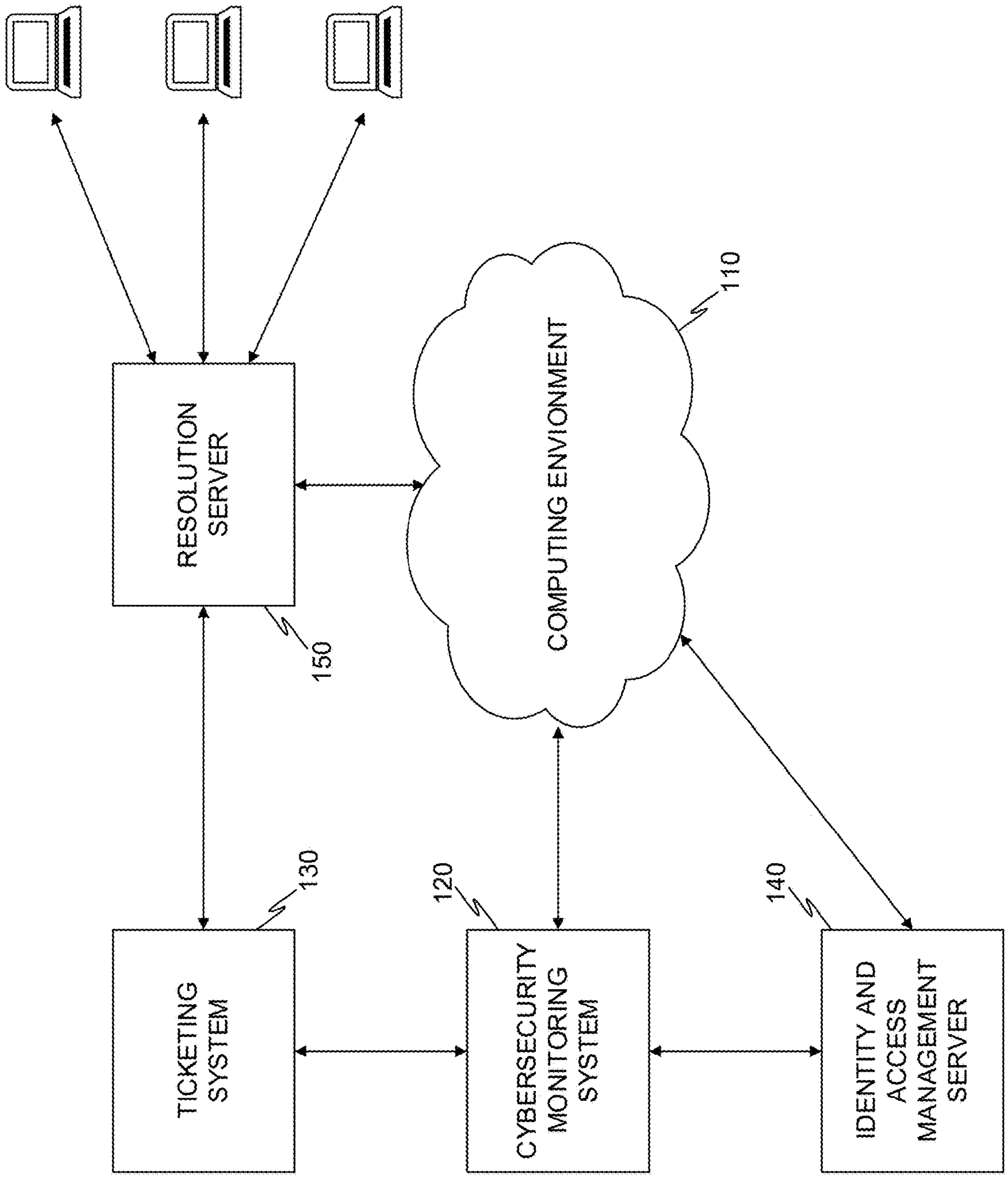
FIG. 1 is an example schematic diagram of a computing environment having a support ticket system and a resolution server for ticket management, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for load management and backpressure reduction in support ticket management. A system is configured to continuously determine resolution capacity (e.g., rate of resolving tickets) of a user, group of users, etc., assigned to resolving tickets of a ticketing system.

According to an embodiment, the system is further configured to assign tickets based on the resolution capacity, severity of open tickets, time since the ticket was opened, etc., in order to provide a user with a group of tickets for resolution, which include a workload that is balanced to a specific user, user group, etc.

It is recognized in this regard that assigning a ticket to a user account can be accomplished by a human. However, a human assigning tickets operates with subjective criteria in assigning such tickets. For example, a human might assign more difficult tickets to a user they like less than another user, and a human may not even be aware of this as a subconscious bias. Furthermore, a human brain is incapable of applying objective criteria over time in a consistent manner.

By contrast, the system and methods disclosed herein solve at least this problem by continuously assigning tickets based on individual workload, group workload, severity score, assessed difficulty of resolution based on previous tickets, combinations thereof, and the like, utilizing objective criteria.

FIG. 1 is an example schematic diagram of a computing environment having a support ticket system and a resolution server for ticket management, implemented in accordance with an embodiment.

According to an embodiment, a computing environment includes a virtual private cloud (VPC), a virtual network (VNet), a virtual private network (VPN), a combination thereof, and the like. In certain embodiments, the computing environment is implemented on a cloud computing infrastructure. In an embodiment, the cloud computing infrastructure is implemented as Amazon@ Web Service (AWS), Microsoft® Azure, Google® Cloud Platform (GCP), a combination thereof, and the like.

In an embodiment, the computing environment 110 is a hybrid computing environment, a cloud computing environment, an on-prem computing environment, a combination thereof, and the like.

In certain embodiments, the computing environment 110 includes a plurality of resources, a plurality of principals, combinations thereof, and the like. In an embodiment, a resource is a virtual machine, a software container, a serverless function, an appliance, a nested resource, an application, a operating system, a library, a binary, a gateway, a firewall, various combinations thereof, and the like.

In some embodiments, a principal is a user account, a service account, a system account, a local account, a role, a user group, a combination thereof, and the like. In certain embodiments, principals are managed in the computing environment 110 through an identity and access management (IAM) server 140.

According to an embodiment, a cybersecurity monitoring system 120 is configured to monitor the computing environment 110 for a cybersecurity risk, a cybersecurity object, a cybersecurity threat, a malware, a vulnerability, an exposure, a misconfiguration, a combination thereof, and the like. In an embodiment, the cybersecurity monitoring system 120 is configured to periodically generate a cybersecurity report including detected cybersecurity issues detected in the computing environment 110.

In an embodiment, the cybersecurity monitoring system 120 is configured to generate an alert, for example in response to detecting a cybersecurity issue as detailed above. In some embodiments, the cybersecurity monitoring system 120 is configured to monitor continuously, periodically, and the like, for cybersecurity issues. In such embodiments, alerts are generated continuously, periodically, etc.

According to an embodiment, the cybersecurity monitoring system 120 is communicatively coupled with a support ticketing system 130. In an embodiment, a ticketing system 130 is configured to generate a support ticket, for example in response to detecting a cybersecurity issue by the cybersecurity monitoring system 120.

In some embodiments, the ticketing system 130 is further configured to assign a ticket to a user account, for example based on user account information detected in the IAM server 140.

In certain embodiments, the ticketing system 130 is configured to assign a ticket to a user account based on a user role, a user group, a tag, and the like, associated with the user account. A ticketing system 130 is, for example, Jira®.

In some embodiments, a cybersecurity monitoring system 120 is one of a plurality of monitoring systems, each generating alerts which result in generation of support tickets. In certain embodiments, the cybersecurity monitoring system 120 generates redundant tickets, for example by generating a support ticket for the same issue detected at a first time, which remains unresolved when detected at a second time.

Support tickets are assigned to humans (i.e., by assigning to a user account) which need to resolve a problem which presents as a cybersecurity issue, for example. However, constantly assigning a human additional tasks often causes a feeling of despair, since no matter how much work the person feels they put in, the situation does not seem to be improved. Another issue that presents human users is alert fatigue, whereby a human becomes indifferent to a number of alerts as the human feels that this number is constantly growing no matter what actions the user takes.

According to an embodiment, a resolution server 150 is configured to access the ticketing system 130 and provide tickets to assigned user accounts. In an embodiment, the resolution server 150 is configured to determine a rate of resolved tickets, for example by user account, by user group, by user role, a combination thereof, and the like.

In certain embodiments, the resolution server 150 is configured to detect a ticket as closed based on receiving, reading, and the like, an indicator associated with a ticket, to determine if a ticket is open or closed.

In some embodiments, the resolution server 150 is configured to determine a severity of a ticket. In certain embodiments, the resolution server 150 determines a severity of a ticket based on, for example, a severity associated with the cybersecurity issue based on which the ticket is generated.

According to an embodiment, the resolution server 150 is configured to determine a resolution capacity. In an embodiment, the resolution capacity is based on a principal, such as a user account, user group, user role, a combination thereof, and the like. In some embodiments, the resolution capacity is a measure of an amount of resolved tickets per unit of time (e.g., resolved tickets per day).

In an embodiment, the resolution server 150 is configured to receive, or otherwise access, support tickets, determine a severity for each ticket, determine a resolution capacity, and assign a support ticket to a user account for resolution, based on the determined severity, the determined resolution capacity, a combination thereof, and the like. In an embodiment, the resolution server 150 is further configured to assign support tickets based on a ticket type.

By providing to a user of a user account only tickets which are determined to be resolvable by the resolution server 150, the user is allowed to focus on a number of tickets which is more manageable to the human mind, which in turn reduces stress, fatigue, and the like. This improved user experience leads to an increase in productivity.

Figure 2:
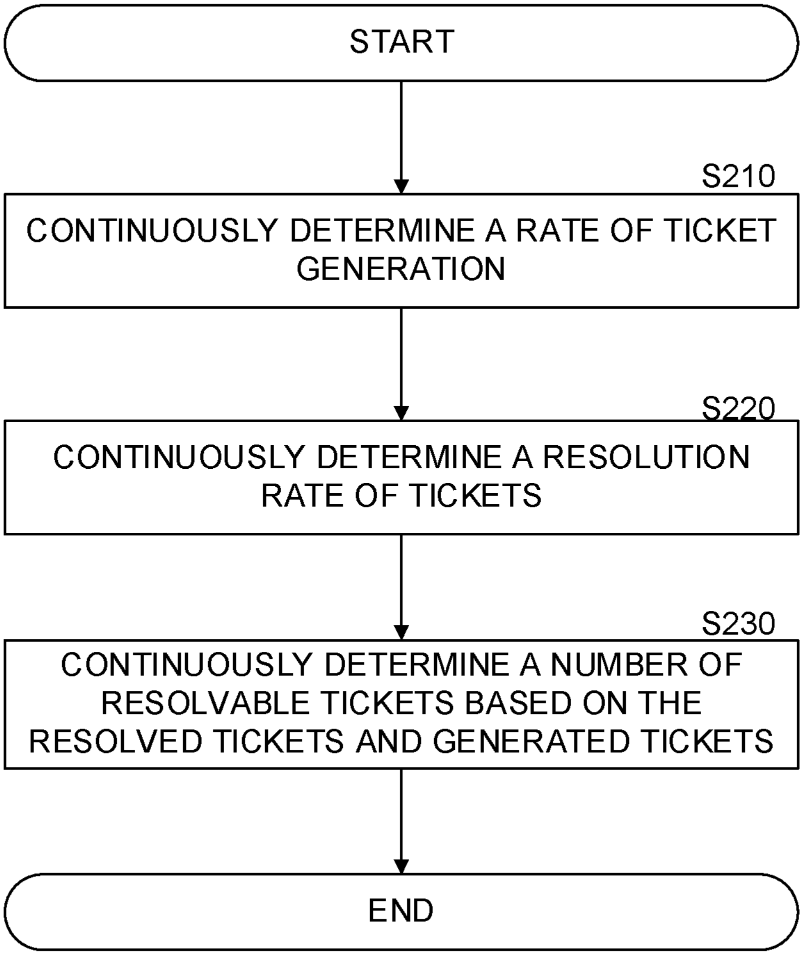
FIG. 2 is an example flowchart of a method for continuously determining a support ticket resolution capacity, implemented in accordance with an embodiment.

FIG. 2 is an example flowchart of a method for continuously determining a support ticket resolution capacity, implemented in accordance with an embodiment. In an embodiment, a resolution capacity is determined per user, per use group, per user role, a combination thereof, and the like. In some embodiments, it is advantageous to continuously determine a resolution capacity, for example in order to assign support tickets to user accounts for resolution, without assigning tickets beyond the capacity of the user to actually resolve such support ticket issues.

At S210, a ticket generation rate is determined. In an embodiment, a resolution server is configured to query a ticketing system and determine a rate of ticket generation, for example by counting a number of tickets generated in a timeframe.

In an embodiment, a ticketing system is configured to store a ticket as a data record including a time stamp (i.e., a time of generation). In some embodiments, the resolution server is configured to query the ticketing system for a number of tickets generated within a time frame, determined based on each individual time stamp of each ticket.

In some embodiments, the ticket generation rate is determined continuously. For example, in an embodiment, a resolution server is configured to continuously determine a rate of ticket generation, for example based on a rolling timeframe window (e.g., number of generated tickets per hour, per day, etc.).

In certain embodiments, the ticket generation rate is determined periodically. For example, in an embodiment, the resolution server is configured to periodically determine a rate of ticket generation.

In some embodiments, a rate of resolution is further determined based on a ticket type. For example, in an embodiment, a ticket related to a cybersecurity issue is generated every 'X' seconds, a ticket related to an identity issue is generated every 'Y' seconds, etc., where 'X' and 'Y' are numbers having a value greater than '0'.

At S220, a resolution rate is determined. In an embodiment, resolution rate is determined continuously. In some embodiments, a resolution rate is determined per identity. For example, in an embodiment, a first resolution rate is determined for a first user account, and a second resolution rate is determined for a second user account.

In an embodiment, the resolution rate is based on a number of resolved tickets a user account is responsible for. For example, in an embodiment, a service ticket is assigned to a first user account. The user of the user account initiates an action which resolves the issue of the service ticket, and the service ticket is closed.

In an embodiment, a ticket is a data record which includes an indicator to indicate if a ticket is 'open' or 'closed'. In some embodiments, the indicator is a binary indicator. In other embodiments, a status indicator for a service ticket includes 'open', 'worked on', 'assigned', 'overdue', 'closed', combinations thereof, and the like.

In some embodiments, the resolution rate is further determined based on ticket type. For example, in an embodiment, a first user account has a resolution rate of 'N' tickets per day for tickets of a first type (e.g., cybersecurity issues), and a resolution rate of 'M' tickets per day for tickets of a second type (e.g., identity issues).

In an embodiment, the resolution rate is determined based on: a sliding timeframe window, a static timeframe window, a user account, a ticket type, a combination thereof, and the like.

At S230, a number of resolvable tickets is determined. In an embodiment, the number of resolvable tickets is determined periodically, continuously, and the like. In some embodiments, the number of resolvable tickets is further determined based on: a sliding timeframe window, a static timeframe window, a user account, a ticket type, a combination thereof, and the like.

In some embodiments, the number of resolvable tickets is based on the resolution rate, the ticket generate rate, a combination thereof, and the like. In certain embodiments, a total number of resolvable tickets is determined based on a plurality of numbers of resolvable tickets, each determined for a respective user account, user role, and the like.

Figure 3:
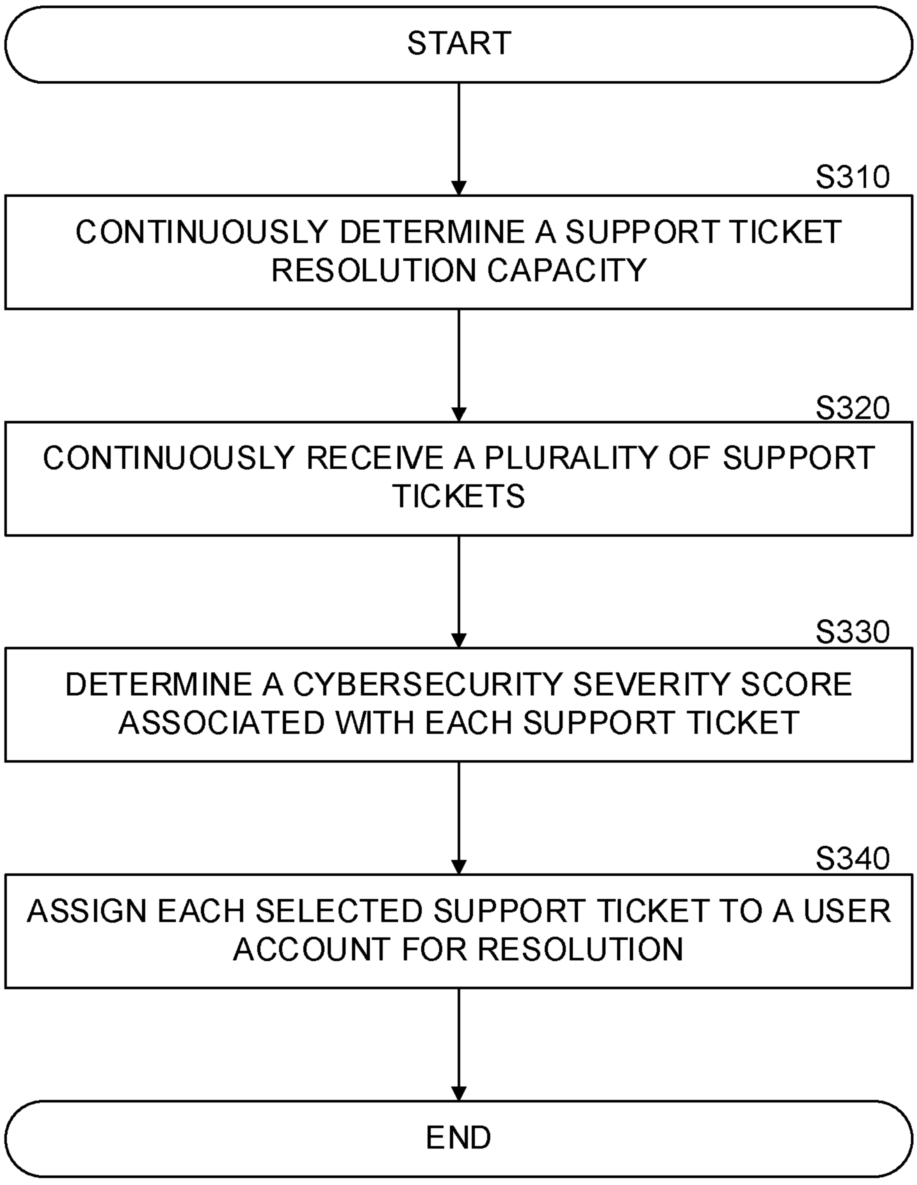
FIG. 3 is a flowchart of a method for load management and back pressure reduction in managing support ticket resolution, implemented in accordance with an embodiment.

FIG. 3 is a flowchart of a method for load management and back pressure reduction in managing support ticket resolution, implemented in accordance with an embodiment. In an embodiment, back pressure refers to a number of open tickets which a user account, role, user group, etc., view as being open tickets, when viewed opposed to a number of tickets which the same user, group, etc. has resolved.

In certain scenarios, a human operator may feel that a number of unresolved (i.e., open) support tickets is larger than can be managed when they view the number of closed tickets. However, this simple view of support tickets does not take into account severity, system types affected (e.g., an issue affecting a test system is less acute than an issue affecting a production system), redundancy (e.g., a ticket is generated for each of a thousand software container nodes on a relatively minor software update issue), combinations thereof, and the like.

These feelings can translate into desperation, which act as a self-fulfilling prophecy which in turn reduces the number of tickets which are resolved by the users of the user accounts. It is therefore desirable to provide a system which is configured to manage load of ticket systems, and reduce back pressure in ticket resolution systems.

At S310, a ticket resolution capacity is determined. In an embodiment, a number of resolvable tickets is determined, based on which a ticket resolution capacity is determined. In an embodiment, the number of resolvable tickets is determined periodically, continuously, and the like. In some embodiments, the number of resolvable tickets is further determined based on: a sliding timeframe window, a static timeframe window, a user account, a ticket type, a combination thereof, and the like.

In some embodiments, the number of resolvable tickets is based on the resolution rate, the ticket generate rate, a combination thereof, and the like. In certain embodiments, a total number of resolvable tickets is determined based on a plurality of numbers of resolvable tickets, each determined for a respective user account, user role, and the like.

In certain embodiments, the resolution capacity is determined based on a plurality of a number of resolvable tickets. In some embodiments, a resolution capacity is determined per user group, per user role, and the like.

At S320, a plurality of support tickets are received. In an embodiment, a support ticket is a data record, including a ticket type, a status indicator, issue data, a combination thereof, and the like. Issue data includes, according to an embodiment, an identifier of a resource, an identifier of a computing environment (e.g., an identifier of a VPC), an identifier of an issue, a CVE identifier, an identifier of a principal (e.g., identifier of a user account, a service account, a role, a user group, etc.), a time stamp, a severity, a risk score, a combination thereof, and the like. In an embodiment, the severity is qualitative, quantitative, a combination thereof, and the like.

In an embodiment, the plurality of support tickets are accessed through a support ticket system. In some embodiments the plurality of support tickets are received periodically, continuously, and the like. In certain embodiments, support tickets are generated, e.g., by a first cybersecurity monitoring solution, periodically, and continuously by a second source, such as a second cybersecurity monitoring solution.

At S330, a severity score is determined. In an embodiment, a severity score is determined for each ticket of the plurality of support tickets. In certain embodiments, a severity score is determined by receiving a severity score from a cybersecurity monitoring solution. In some embodiments, a severity score is determined based on an alert, a plurality of alerts, and the like, received from a plurality of sources. In an embodiment, a source is cybersecurity monitoring solution, an identity and access management service, a ticketing system, a policy server, various combinations thereof, and the like.

In certain embodiments, the severity score is quantitative (e.g., a number between 1 and 10), qualitative (e.g., 'low' to 'high'), a combination thereof, and the like. In some embodiments, the severity score is further determined by the issue type. In some embodiments, the severity score is a cybersecurity severity score.

At S340, a selected ticket is assigned. In an embodiment, assigning a ticket includes selecting a user account, a service account, a user role, a user group, a combination thereof, and the like, based on which a ticket is assigned for resolution.

In an embodiment, a support ticket is selected for assignment based on the severity score. In some embodiments, a plurality of support tickets are selected for assignment, such that a first ticket includes a first severity and a second ticket includes a second severity.

According to an embodiment, a plurality of tickets are selected for assignments, such that a first number of selected tickets of a first type correspond to a first resolution rate, and a second number of selected tickets of a second type correspond to a second resolution rate. This is advantageous, for example, where resolving tickets of a first type is faster than resolution of tickets of a second type, thereby allowing a user to increase confidence in their ability to resolve tickets, while periodically providing harder tickets to resolve (e.g., ticket types which typically take longer to resolve).

In certain embodiments, by continuously determining for a user account their resolution capacity of various support tickets, the resolution server is able to assign support tickets in a predefined dynamic manner to each user account, ensuring that important (e.g., high severity) tickets are resolved, while also providing the users a sense of progress (e.g., by mixing different types of tickets based on an individual resolution capacity).

According to an embodiment, a resolution capacity is further determined based on a mean time to resolve a plurality of tickets, an average time to resolve a plurality of tickets, etc. In some embodiments, the plurality of tickets are all of a first type, some of a first type, some of a second type, etc.

Figure 4:
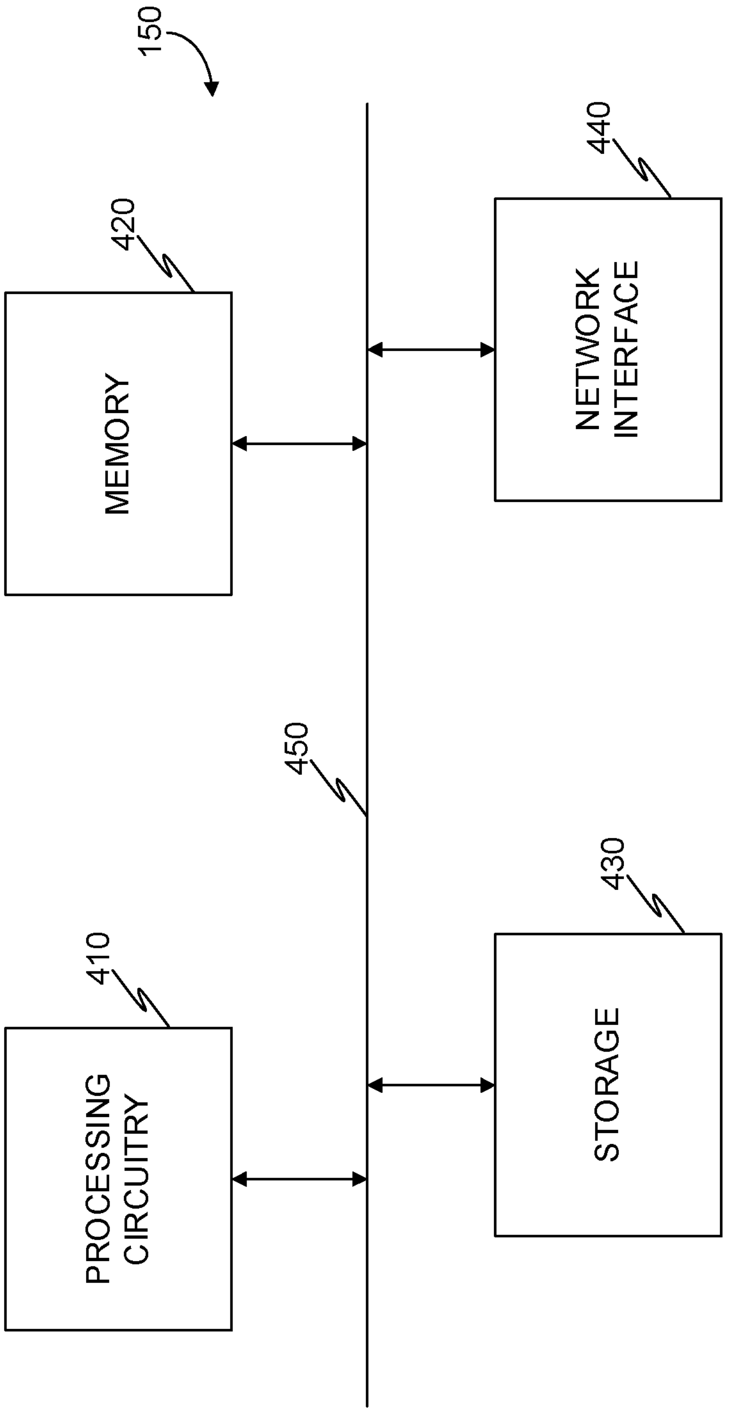
FIG. 4 is an example schematic diagram of a resolution server according to an embodiment.

FIG. 4 is an example schematic diagram of a resolution server 150 according to an embodiment. The resolution server 150 includes a processing circuitry 410 coupled to a memory 420, a storage 430, and a network interface 440. In an embodiment, the components of the resolution server 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof. In an embodiment, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein may be stored in the storage 430, in the memory 420, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 440 is configured to provide the resolution server 150 with communication with, for example, the ticketing system 130, the cybersecurity monitoring system 120, the identity and access management server 140, and the like.

It should be understood that the embodiments described herein are not limited to the specific architecture illustrated in FIG. 4, and other architectures may be equally used without departing from the scope of the disclosed embodiments.

Furthermore, in certain embodiments the ticketing system 130, the cybersecurity monitoring system 120, the identity and access management server 140, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for load management and back pressure reduction in managing support ticket resolution executed in a hybrid computing environment comprising a resolution server communicatively coupled with a ticketing system, a cybersecurity monitoring system, and an identity and access management (IAM) server, each comprising processing circuitry and stored instructions, the method comprising:

continuously determining, by the resolution server, support ticket resolution capacity for a user account based on a number of previously resolved support tickets, wherein continuously determining includes querying the ticketing system for ticket records having a status indicator indicating a closed ticket and determining, using timestamps stored in the ticket records, a resolution rate representing a number of resolved tickets per unit time;

continuously receiving, by the ticketing system, a plurality of support tickets, each support ticket being stored as a ticket record including at least a ticket type, a status indicator, issue data, and a timestamp, the issue data including an identifier of a computing environment indicating a system type affected and an identifier of an issue, wherein the plurality of support tickets includes redundant support tickets indicated by multiple ticket records sharing the identifier of the issue;

periodically determining, by the resolution server, a severity score associated with each support ticket of the plurality of support tickets, wherein the severity score represents a quantitative degree of urgency computed by aggregating data from the cybersecurity monitoring system, the IAM server, and the ticketing system, wherein periodically determining includes receiving an alert or a plurality of alerts from a plurality of sources including the cybersecurity monitoring system, the IAM server, and the ticketing system, and determining the severity score based on the alert or the plurality of alerts from the plurality of sources, and wherein the severity score is further determined based on an issue type of the support ticket;

automatically assigning, by the resolution server, a support ticket of the plurality of support tickets to a user account based on the determined severity score, an elapsed time since ticket generation computed using the timestamp of the ticket record, and a determined resolution capacity, such that a number of assigned support tickets to the user account does not exceed the determined resolution capacity, wherein automatically assigning includes setting the status indicator of the ticket record to a value indicating that the support ticket is assigned, and generating, via a user interface, a visualization indicating the resolution capacity for the user account, a number of support tickets assigned to the user account, a number of unresolved support tickets of the plurality of support tickets, and a number of resolved support tickets.

2. The method of claim 1, further comprising:

determining a support ticket resolution capacity based on mean time to resolve a plurality of tickets.

3. The method of claim 1, further comprising:

determining a support ticket resolution capacity based on a plurality of ticket types.

4. The method of claim 1, further comprising:

determining that an assigned ticket is resolved; and assigning an additional ticket to a user account associated with the resolved ticket.

5. The method of claim 1, further comprising:

assigning a first number of support tickets to the user account based on the resolution capacity and a first type of ticket; and assigning a second number of support tickets to the user account based on the resolution capacity and a second type of ticket, wherein the first and second number of support tickets do not exceed the resolution capacity.

6. The method of claim 1, wherein assigning the support ticket further includes:

determining a user group associated with the user account; and assigning the support ticket further based on the determined user group.

7. The method of claim 1, wherein the resolution rate is determined based on a sliding timeframe window.

8. The method of claim 1, wherein continuously determining the support ticket resolution capacity includes determining a first resolution rate for support tickets of a first ticket type and a second resolution rate for support tickets of a second ticket type.

9. The method of claim 1, wherein the user account is associated with a principal managed by the IAM server, and wherein automatically assigning the support ticket is further based on a user role or a user group associated with the principal.

10. The method of claim 1, wherein the status indicator of the ticket record is settable to a plurality of values including open, worked on, assigned, overdue, and closed.

11. The method of claim 1, wherein the identifier of the computing environment includes an identifier of a virtual private cloud.

12. The method of claim 1, further comprising assigning, to the user account, a first number of support tickets of a first ticket type and a second number of support tickets of a second ticket type that takes longer to resolve than the first ticket type, such that support tickets of the first ticket type and support tickets of the second ticket type are mixed in assignment to the user account.

13. A non-transitory computer-readable medium storing a set of instructions for load management and back pressure reduction in managing support ticket resolution executed in a hybrid computing environment comprising a resolution server communicatively coupled with a ticketing system, a cybersecurity monitoring system, and an identity and access management (IAM) server, the set of instructions comprising:

one or more instructions that, when executed by one or more processors of the hybrid computing environment, cause the hybrid computing environment to:

continuously determine, by the resolution server, support ticket resolution capacity for a user account based on a number of previously resolved support tickets, wherein continuously determining includes querying the ticketing system for ticket records having a status indicator indicating a closed ticket and determining, using timestamps stored in the ticket records, a resolution rate representing a number of resolved tickets per unit time;

continuously receive, by the ticketing system, a plurality of support tickets, each support ticket being stored as a ticket record including at least a ticket type, a status indicator, issue data, and a timestamp, the issue data including an identifier of a computing environment indicating a system type affected and an identifier of an issue, wherein the plurality of support tickets includes redundant support tickets indicated by multiple ticket records sharing the identifier of the issue;

periodically determine, by the resolution server, a severity score associated with each support ticket of the plurality of support tickets, wherein the severity score represents a quantitative degree of urgency computed by aggregating data from the cybersecurity monitoring system, the IAM server, and the ticketing system, wherein periodically determining includes receiving an alert or a plurality of alerts from a plurality of sources including the cybersecurity monitoring system, the IAM server, and the ticketing system, and determining the severity score based on the alert or the plurality of alerts received from the plurality of sources, and wherein the severity score is further determined based on an issue type of the support ticket;

automatically assign, by the resolution server, a support ticket of the plurality of support tickets to a user account based on the determined severity score, an elapsed time since ticket generation computed using the timestamp of the ticket record, and a determined resolution capacity, such that a number of assigned support tickets to the user account does not exceed the determined resolution capacity, wherein automatically assigning includes setting the status indicator of the ticket record to a value indicating that the support ticket is assigned; and generate, via a user interface, a visualization indicating the resolution capacity for the user account, a number of support tickets assigned to the user account, a number of unresolved support tickets of the plurality of support tickets, and a number of resolved support tickets.

14. A system for load management and back pressure reduction in managing support ticket resolution executed in a hybrid computing environment comprising a resolution server communicatively coupled with a ticketing system, a cybersecurity monitoring system, and an identity and access management (IAM) server, the hybrid computing environment comprising:

a processing circuitry;

a memory, the memory containing instructions that, when executed by the processing circuitry, configure the hybrid computing environment to:

continuously determine, by the resolution server, support ticket resolution capacity for a user account based on a number of previously resolved support tickets, wherein continuously determining includes querying the ticketing system for ticket records having a status indicator indicating a closed ticket and determining, using timestamps stored in the ticket records, a resolution rate representing a number of resolved tickets per unit time;

continuously receive, by the ticketing system, a plurality of support tickets, each support ticket being stored as a ticket record including at least a ticket type, a status indicator, issue data, and a timestamp, the issue data including an identifier of a computing environment indicating a system type affected and an identifier of an issue, wherein the plurality of support tickets includes redundant support tickets indicated by multiple ticket records sharing the identifier of the issue;

periodically determine, by the resolution server, a severity score associated with each support ticket of the plurality of support tickets, wherein the severity score represents a quantitative degree of urgency computed by aggregating data from the cybersecurity monitoring system, the IAM server, and the ticketing system, wherein periodically determining includes receiving an alert or a plurality of alerts from a plurality of sources including the cybersecurity monitoring system, the IAM server, and the ticketing system, and determining the severity score based on the alert or the plurality of alerts received from the plurality of sources, and wherein the severity score is further determined based on an issue type of the support ticket;

automatically assign, by the resolution server, a support ticket of the plurality of support tickets to a user account based on the determined severity score, an elapsed time since ticket generation computed using the timestamp of the ticket record, and a determined resolution capacity, such that a number of assigned support tickets to the user account does not exceed the determined resolution capacity, wherein automatically assigning includes setting the status indicator of the ticket record to a value indicating that the support ticket is assigned; and generate, via a user interface, a visualization indicating the resolution capacity for the user account, a number of support tickets assigned to the user account, a number of unresolved support tickets of the plurality of support tickets, and a number of resolved support tickets.

15. The system of claim 14, wherein the memory contains further instructions which when executed by the processing circuitry further configure the system to:

determine support ticket resolution capacity based on mean time to resolve.

16. The system of claim 14, wherein the memory contains further instructions which when executed by the processing circuitry further configure the system to:

determine a support ticket resolution capacity based on a plurality of ticket type.

17. The system of claim 14, wherein the memory contains further instructions which when executed by the processing circuitry further configure the system to:

determine that an assigned ticket is resolved; and assign an additional ticket to a user account associated with the resolved ticket.

18. The system of claim 14, wherein the memory contains further instructions which when executed by the processing circuitry further configure the system to:

assign a first number of support tickets to the user account based on the resolution capacity and a first type of ticket; and assign a second number of support tickets to the user account based on the resolution capacity and a second type of ticket.

19. The system of claim 14, wherein assigning the support ticket further includes:

determining a user group associated with the user account; and assigning the support ticket further based on the determined user group.

* * * * *